United States Patent
Moon et al.

(10) Patent No.: US 10,249,933 B2
(45) Date of Patent: Apr. 2, 2019

(54) ANTENNA DEVICE AND ELECTRONIC DEVICE INCLUDING THE SAME

(71) Applicant: Samsung Electronics Co., Ltd., Gyeonggi-do (KR)

(72) Inventors: Ji-Hye Moon, Seoul (KR); Jang-Sun Yoo, Seoul (KR); Myeong-Gil Lee, Seoul (KR); Chee-Hwan Yang, Gyeonggi-do (KR); Kwang-Yong Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/620,941

(22) Filed: Jun. 13, 2017

(65) Prior Publication Data
US 2017/0373374 A1     Dec. 28, 2017

(30) Foreign Application Priority Data

Jun. 27, 2016  (KR) ................. 10-2016-0080051

(51) Int. Cl.
*H01Q 1/24*  (2006.01)
*H01Q 1/22*  (2006.01)
*G06F 1/16*  (2006.01)
*H01Q 21/28*  (2006.01)

(52) U.S. Cl.
CPC ......... *H01Q 1/2258* (2013.01); *G06F 1/1698* (2013.01); *H01Q 1/2266* (2013.01); *H01Q 1/24* (2013.01); *H01Q 1/243* (2013.01); *H01Q 21/28* (2013.01)

(58) Field of Classification Search
CPC ...... H01Q 1/22; H01Q 1/2258; H01Q 1/2266; H01Q 1/24; H01Q 21/28; H01Q 1/243
See application file for complete search history.

(56) References Cited

U.S. PATENT DOCUMENTS

| | | | |
|---|---|---|---|
| 9,203,137 B1 | 12/2015 | Guterman et al. | |
| 2009/0262029 A1* | 10/2009 | Chiang | H01Q 1/2266 343/702 |
| 2011/0273352 A1 | 11/2011 | You | |
| 2013/0344907 A1 | 12/2013 | Pan et al. | |
| 2014/0097992 A1 | 4/2014 | Cheng et al. | |
| 2014/0097993 A1 | 4/2014 | Hotta et al. | |
| 2014/0361932 A1 | 12/2014 | Irci et al. | |
| 2015/0200443 A1 | 7/2015 | Lo et al. | |

FOREIGN PATENT DOCUMENTS

JP     2005-175667 A     6/2005

OTHER PUBLICATIONS

International Search Reported dated Sep. 19, 2017.

* cited by examiner

*Primary Examiner* — Hoang V Nguyen
(74) *Attorney, Agent, or Firm* — Cha & Reiter, LLC.

(57) ABSTRACT

Disclosed is an antenna device for an electronic device including a first housing and a second housing rotatably coupled to the first housing about a hinge axis. The antenna device may include: a radiation conductor disposed in the first housing; and a reflection member disposed adjacent to the radiation conductor in the first housing. Radio waves transceived by the radiation conductor are radiated via the reflection member. Also disclosed is an electronic device including the antenna device. The antenna device and the electronic device including the same may be variously implemented according to embodiments.

17 Claims, 10 Drawing Sheets

ANTENNA DEVICE AND ELECTRONIC DEVICE INCLUDING THE SAME

CLAIM OF PRIORITY

This application claims the priority under 35 U.S.C. § 119(a) to Korean Application Serial No. 10-2016-0080051, which was filed in the Korean Intellectual Property Office on Jun. 27, 2016, the entire content of which is hereby incorporated by reference.

TECHNICAL FIELD

Various embodiments of the present disclosure relate to a wireless transmission/reception device. For example, various embodiments of the present disclosure relate to an antenna device and/or an electronic device including the same.

BACKGROUND

Typically, the term "electronic device" may be used for a device that allows a user to utilize various communication and multimedia functions, such as voice communication, short message transmission and reception, multimedia functions, such as music and video playback, and other entertainment functions such as allowing the user to play a game. Such an electronic device is configured in various forms. For example, the electronic device's external configuration may be bar-type, clamshell-type, sliding-type, etc.

In addition, the electronic device may be a desktop computer used in home or office, or a laptop computer with improved portability features.

To allow for electronic communication, these electronic devices may be able to connect commercially available wireless communication networks. For example, an electronic device such as a laptop computer can be connected to a commercially available communication network by being connected to a wireless Access Point (AP) provided within a limited area, like a wireless Local Area Network (LAN). Alternatively, the electronic device may connect to a mobile cellular network such as an LTE™ network For wireless communication connections based on various communication protocols, such as Bluetooth, wireless LAN, Internet communication, and inter-device communications with Internet of Things (IoT) devices, an electronic device may be equipped with a plurality of antenna devices operating in different frequency bands. In some embodiments, the electronic device may include a plurality of antenna devices operating in the same frequency band for high-speed data transmission, stable wireless connection maintenance, and the like.

When the performance (e.g., data processing speed, memory capacity, data storage capacity, or quality of input and output video or sound) is the same, small size, weight, and/or elegant appearance may be the user's selection criteria for an electronic device. For example, portability and/or appearance may be the primary criterion for selecting an electronic device. In accordance with this trend, the size and weight of electronic devices are gradually being reduced, and these devices may be finished in a metallic exterior for a more pleasing appearance. However, the exterior metallic material used may deteriorate performance of the antenna devices within the electronic devices.

SUMMARY

Various embodiments of the present disclosure may provide an electronic device having a more pleasing appearance due to the use of metal for the device's exterior.

Various embodiments of the present disclosure may provide an antenna device and/or an electronic device including the same, which can ensure stable wireless transmission/reception performance even in the electronic device's exterior is finished in metal.

An antenna device according to one embodiment of the present disclosure is an antenna device for an electronic device including a first housing and a second housing rotatably coupled to the first housing about a hinge axis. The antenna device may include a radiation conductor disposed in the first housing and a reflection member disposed adjacent to the radiation conductor in the first housing. Radio waves transceived by the radiation conductor may be radiated via the reflection member.

According to one embodiment, an electronic device may include a first housing including a hinge recess formed on one side edge thereof, a second housing including a hinge protrusion formed on one side edge thereof, the hinge protrusion adapted to rotatably couple to the hinge recess, and an antenna device disposed in the first housing adjacent to the hinge recess.

The antenna device may include a radiation conductor and a reflection member disposed adjacent to the radiation conductor. The reflection member may be configured to change a radiation direction of radio waves transceived by the radiation conductor.

According to one embodiment of the present disclosure, an antenna device and/or an electronic device including the antenna device is capable of adjusting, using the reflection member, the radiation direction of radio waves transmitted/received through the radiation conductor. For example, it is possible to prevent, using the reflection member, the deterioration of radiation performance by another metal structure of the electronic device. In some embodiments, the antenna device and/or the electronic device including the antenna device is capable of ensuring improved directionality of the radio waves. Accordingly, it is possible to compensate for deterioration of the radiation performance of the antenna device in a specific direction due to the presence of metal structures in the electronic device or on the exterior of the electronic device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

As the invention disclosed by the present disclosure allows for various changes and numerous embodiments, some exemplary embodiments will be described in detail with reference to the accompanying drawings. However, it should be understood that the present disclosure is not limited to the specific embodiments, but the present disclosure includes all modifications, equivalents, and alternatives within the spirit and the scope of the present disclosure.

Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

Further, relative terms such as "a front surface," "a rear surface," "a top surface," "a bottom surface," and the like which are described with respect to the orientation in the drawings may be replaced by ordinal numbers such as first and second. When ordinal numbers such as first and second are used, their order is determined in the mentioned order and may be arbitrarily changed.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not exclude the existences or the possibility of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings the same as the contextual meanings in the relevant field of art, and are not to be interpreted to have excessively formal meanings unless clearly defined in the present specification.

In the present disclosure, the electronic device may be called a terminal, a portable terminal, a mobile terminal, a communication terminal, a portable communication terminal, a portable mobile terminal, a touch screen or the like.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function. The electronic device may be pocket-sized. Further, the electronic device may be a flexible device or contain a flexible display device.

The electronic device may communicate with an external electronic device, such as a server or the like, or perform an operation in cooperation with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

Figure 1:
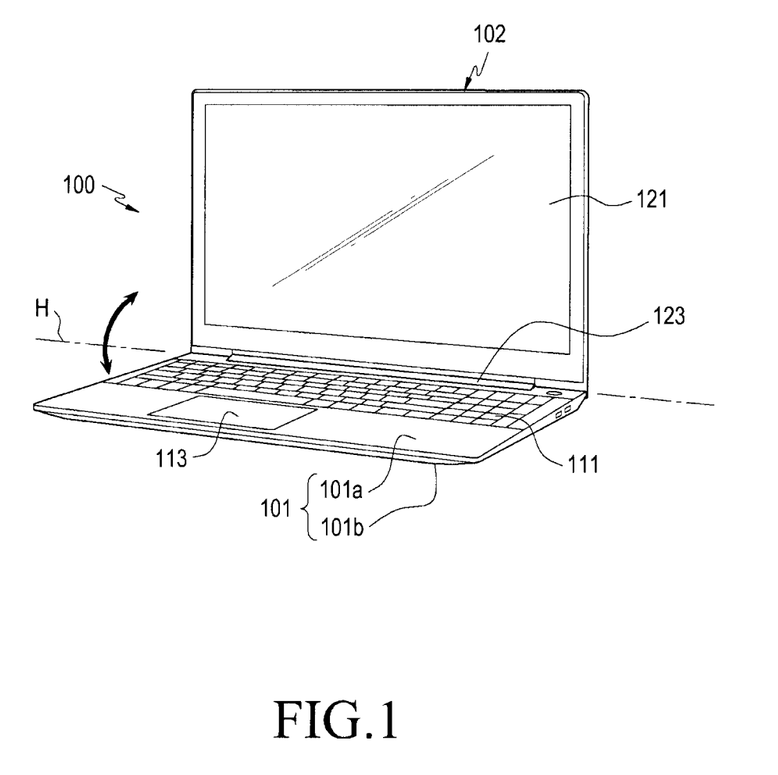
FIG. 1 is a perspective view illustrating an electronic device according to one embodiment of the present disclosure.

FIG. 1 is a perspective view illustrating an electronic device 100 according to one embodiment of the present disclosure.

Referring to FIG. 1, according to one embodiment of the present disclosure, an electronic device 100, which may be a laptop, may include a first housing 101 and a second housing 102 rotatably coupled to the first housing 101. For example, the second housing 102 may be rotated from a position where the second housing 102 is folded to face the first housing 101 (i.e. when the laptop is closed) to a position where the second housing 102 is opened by a predetermined angle with respect to the first housing 101 (i.e. when the laptop is open). According to one embodiment, the second housing 102 may be rotated from the position where the second housing 102 is folded onto the first housing 101 (i.e. when the laptop is closed) to be at an angel of 270 degrees or more with respect to the first housing 101. The second housing 102 may then independently maintain the angel with respect to the first housing 101.

According to one embodiment, at least a portion of the first housing 101 and/or the second housing 102 may be made of a metal material. For example, when the electronic device 100 is closed, at least a portion of the exterior surface of the electronic device 100 may be made of a metal material. In some embodiments, when the electronic device is open, at least a portion of the exterior surface of the second housing 102 may be made of a metal material.

The first housing 101 may include a keyboard 111 and a touch pad 113, which are provided on one face of the first housing 101, and may accommodate a main board, an antenna device (e.g., an antenna device 103 in FIG. 2 and/or FIG. 3), a battery, etc. therein. In one embodiment, the keyboard 111 and/or the touch pad 113 may be exposed as the second housing 102 is rotated. In some embodiments, a memory, a storage device (e.g., a hard disk drive or a solid state drive), a communication module, an audio module, etc. may be mounted on the main board. In other embodiments, the first housing 101 may include an upper case 101*a* that is mounted with the keyboard 111, and a lower case 101*b* to be coupled to the upper case 101*a*. The main board, the antenna device, etc. may be disposed between the upper case 101*a* and the lower case 101*b* so that they are housed within the first housing 101. According to one embodiment, the upper case 101a and/or the lower case 101b may be at least partially made of a metal material.

As will be described with reference to FIGS. 2 and 3, the first housing 101 may include a hinge recess (e.g., a hinge recess 115 of FIG. 2) formed on one side edge of the first housing 101. The hinge recess 115 may be formed on the upper face of the first housing 101, and/or on the upper face and one side face that is in contact with the upper face. For example, the hinge recess 115 may have a groove shape that is recessed from the upper face of the first housing 101, or a shape that is recessed from each of the upper face of the first housing 101 and one side face that is in contact with the upper face. In some embodiments, the hinge recess 115 may extend along one direction (e.g., in the direction of a hinge axis H in FIG. 1).

The second housing 102 may include a display device 121 disposed on the front face thereof, and a part or all of the surface other than the display area may be made of a metal material. The second housing 102 may include a hinge protrusion 123 protruding from one side edge thereof. The hinge protrusion 123 may protrude from the front face of the second housing 102 and/or the front face and one side edge of the second housing 102, and may extend along the hinge axis H direction. According to one embodiment, the opposite ends of the hinge protrusion 123 may be coupled to the inner wall at the opposite ends of the hinge recess 115, thereby rotatably coupling to the hinge recess 115.

In some embodiments, the electronic device 100 may include a hinge device that rotatably couples the hinge protrusion 123 to the inner walls of the hinge recess 115. The hinge device may be accommodated inside the hinge protrusion 123 and/or inside the first housing 101. In one embodiment, the hinge protrusion 123 and/or the hinge device may at least partially include a metallic portion.

Figure 2:
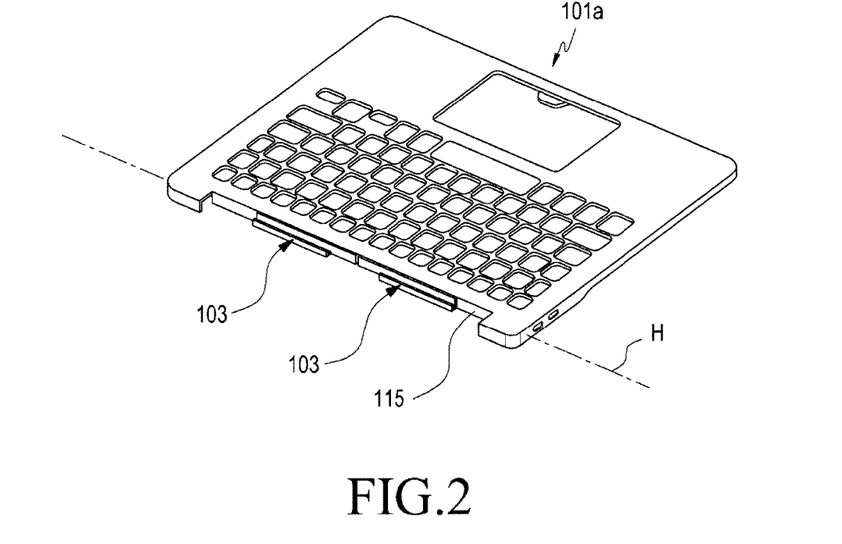
FIG. 2 is a perspective view illustrating when antenna devices are mounted in the electronic device according to one embodiment of the present disclosure.
Figure 3:
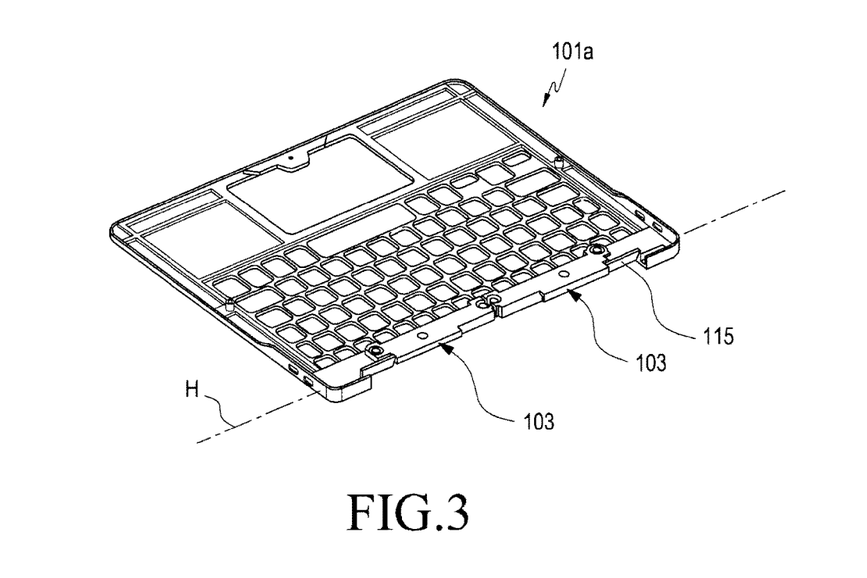
FIG. 3 is another perspective view illustrating when antenna devices are mounted in the electronic device according to one embodiment of the present disclosure when viewed in a different direction.
Figure 4:
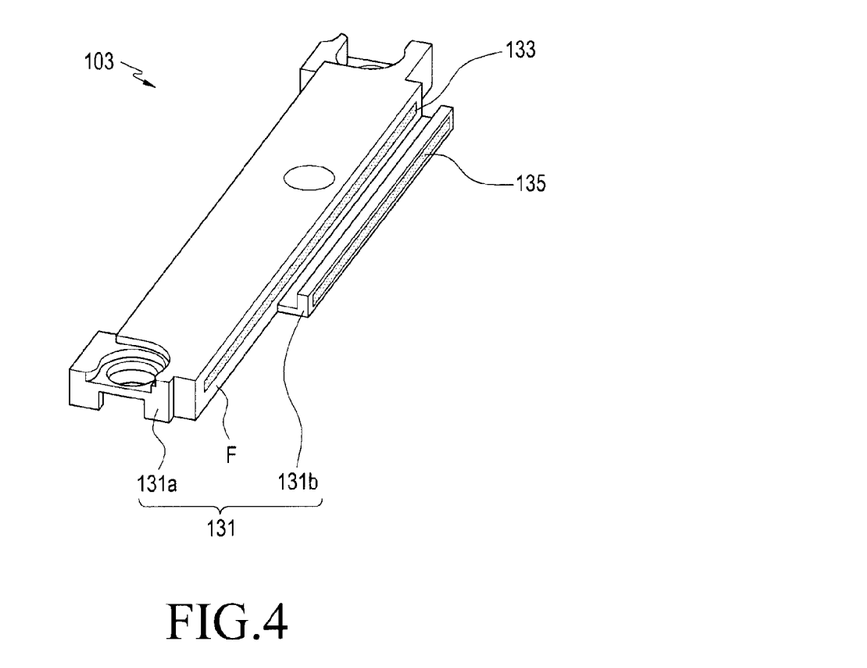
FIG. 4 is a perspective view illustrating an antenna device according to one embodiment of the present disclosure.

FIG. 2 is a perspective view illustrating when the antenna devices 103 are mounted in an electronic device (e.g., the electronic device 100 of FIG. 1) according to the one embodiment of the present disclosure. FIG. 3 is another perspective view illustrating when the antenna devices 103 are mounted in the electronic device according to one embodiment of the present disclosure. FIGS. 2 and 3 are perspective view of the same upper case 101a with the antenna devices 103 in different directions. FIG. 4 is a perspective illustrating an antenna device 103 according to one embodiment of the present disclosure.

The electronic device 100 may be connected to communication networks according to various communication protocols, such as a commercial communication network protocol, wireless LAN, Bluetooth, near field communication (NFC), and WiGig. For example, the electronic device 100 may include an antenna device for wireless communication connection of various frequency bands.

Referring to FIGS. 2 and 3, the antenna device 103 according to one embodiment of the present disclosure may be accommodated inside the above-mentioned first housing 101, for example, in the upper case 101a. In some embodiments, a plurality of antenna devices 103 may be mounted on an inner face of the first housing 101 and/or an inner face of the upper case 101a. Such plurality of the antenna devices 103 may be aligned side by side in one direction (e.g., the hinge axis H direction), and may be at least partially exposed to the exterior or outside of the first housing 101 or upper case 101a. According to one embodiment, the antenna devices 103 may be partially exposed through the hinge recess 115 formed in the first housing 101. For example, a face of the hinge recess 115 may include a window or an opening and a portion of the antenna devices 103 may be fitted into the window to form a portion of the face of the hinge recess 115, thereby exposing the antenna device 103 to the outside of the housing.

Further referring to FIG. 4, the antenna device 103 includes an antenna carrier 131, a radiation conductor 133, and a reflection member 135. Each of the radiation conductor 133 and reflection member 135 are mounted on the antenna carrier 131. In one embodiment, when the antenna carrier 131 is disposed in the inside of the first housing 101 and/or on the inner face of the upper case 101a, at least one of the radiation conductor 133 and the reflection member 135 may be disposed in the first housing 101 or in the upper case 101a.

The antenna carrier 131 may be made of an insulator such as a synthetic resin and/or a dielectric body, and may include a body portion 131a and an extension portion 131b protruding from a side face F of the body portion 131a. The body portion 131a and the extension portion 131b may be integrally molded by injection molding or the like. In some embodiments, the body portion 131a and the extension portion 131b may be manufactured as separate parts, and may then be assembled through an assembly process, as described below.

The radiation conductor 133 may be disposed on one side face F of the body portion 131a, and may be positioned to face at least a portion of the extension portion 131b. The radiation conductor 133 may transmit radio waves by being provided with power from a communication module of the electronic device 100 or the like. The radiation conductor 133 may also receive radio waves and provide the received signal to the communication module. The reflection member 135 may be disposed on one face of the extension portion 131b with a portion of the extension portion 131b being interposed therebetween. Alternatively, the reflection member 135 may be disposed on an inner face of the extension portion 131b to face the radiation conductor 133 or a portion of the radiation conductor 133.

According to one embodiment, the radiation direction of the radio waves transceived by the radiation conductor 133 may be changed by the reflection member 135. For example, the traveling direction of the radio waves radiated (emitted) from the radiation conductor 133 may be altered by the presence of the reflection member 135, such that the traveling direction of the radio waves radiated from the radiation conductor 133 is different from the traveling direction of the radio waves radiated to the outside of the electronic device 100. According to one embodiment, the radiation conductor 133 and/or the reflection member 135 may be a conductive pattern fabricated by processing a thin metal plate, such as copper, gold, or silver. Alternatively, the radiation conductor 133 and/or the reflection member 135 may be a conductive pattern plated or deposited on the surface of the antenna carrier 131.

Referring to FIGS. 2 and 3 again, as described above, a portion of the antenna device 103 (e.g., a portion of the extension portion 131b) may be exposed to the outside of the first housing 101. For example, at least a portion of the extension portion 131b may be exposed through an opening of the hinge recess 115. In one embodiment, when a portion of the extension portion 131b is exposed to the outside, the reflection member 135 also be exposed. Alternatively, the reflection member 135 may be disposed on the inner face of the extension portion 131b and may not be exposed to the outside when the extension portion 131b is exposed to the outside.

According to one embodiment, when a portion of the antenna device 103 (e.g., a portion of the extension portion 131b) is exposed to the outside, a portion of the second housing 102 may conceal the exposed antenna device 103. For example, a portion of the antenna device 103 may be disposed in the hinge recess 115, and the hinge protrusion 123 may be engaged with the hinge recess 115 so as to conceal a portion of the antenna device 103 that is exposed to the outside of the first housing 101.

Figure 5:
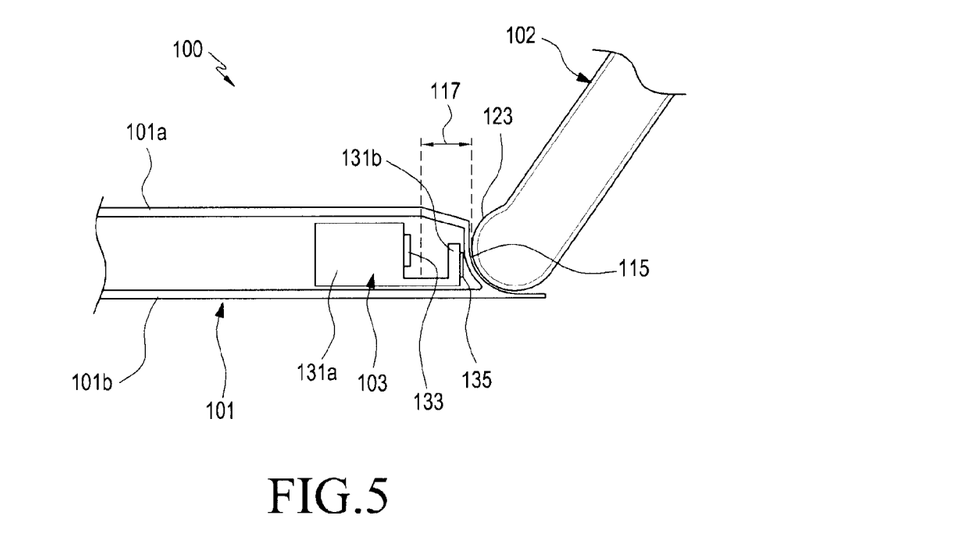
FIG. 5 is a cross-sectional view illustrating a configuration of an electronic device according to one embodiment of the present disclosure.

FIG. 5 is a cross-sectional view illustrating a configuration of an electronic device 100 according to one embodiment of the present disclosure.

Referring to FIG. 5, according to one embodiment of the present disclosure, the antenna device 103 may be disposed adjacent to one side edge of the first housing 101 while being accommodated in the first housing 101. In one embodiment, the antenna devices 103 may be disposed adjacent to the hinge recess 115 of the first housing 101. According to one embodiment, a portion of the hinge recess 115 adjacent to the antenna device 103 and/or a section 117 of the upper case 101a of the first housing 101 may be made of a non-metallic material (e.g., a material that allows transmission of radio waves).

When disposed inside the first housing 101, the radiation conductor 133 may be positioned near the hinge recess 115, and the reflection member 135 may be positioned between the radiation conductor 133 and the hinge recess 115. In some embodiments, in adjusting the traveling direction of radio waves transmitted/received by the radiation conductor 133, the reflection member 135 may be positioned within a predetermined distance from the radiation conductor 133. For example, the reflection member 135 may be disposed within a distance of λ/10 from the radiation conductor 133. Here, "λ" may mean the wavelength of the resonant frequency transmitted/received by the radiation conductor 133 and/or the antenna device 103.

Figure 6:
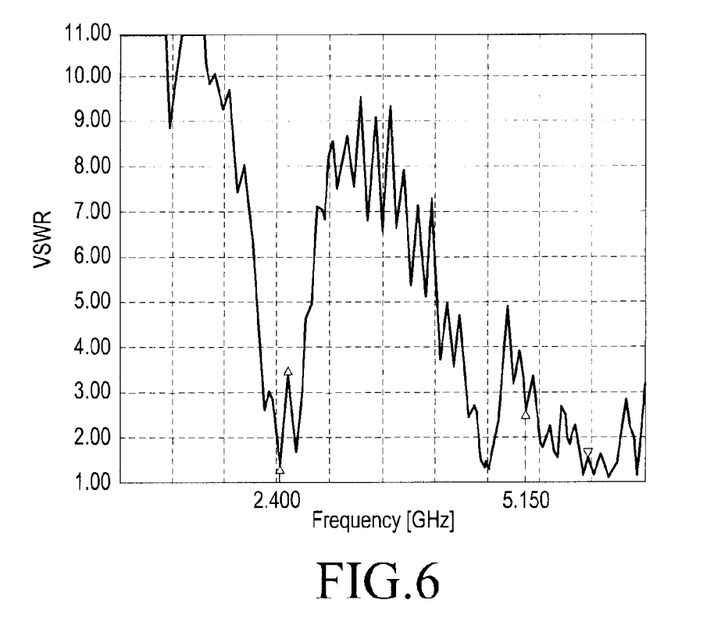
FIG. 6 and FIG. 7 are graphs showing a resonance characteristic of an antenna device in an electronic device according to one embodiment of the present disclosure.
Figure 7:
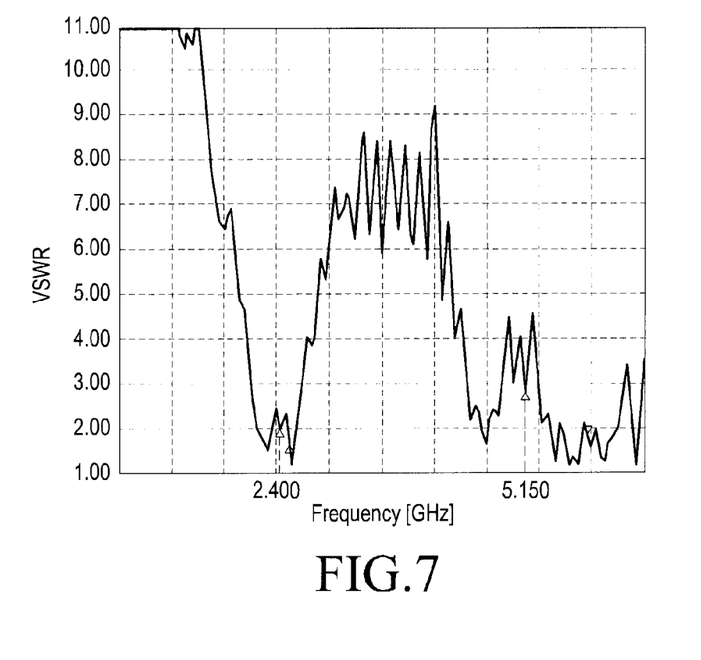

FIGS. 6 and 7 are graphs showing a resonance characteristic of an antenna device in an electronic device according to one embodiment of the present disclosure (e.g., the electronic device 100 of FIG. 5).

The graphs of FIGS. 6 and 7 illustrate Voltage Standing Wave Ratios (VSRWs) before (FIG. 6) and after (FIG. 7) mounting the above-mentioned reflection member (e.g., the reflection member 135 of FIG. 5), respectively. The measurement results are summarized in Table 1 below:

TABLE 1

| Resonance frequency [GHz] | Voltage standing wave ratio | |
|---|---|---|
| | Before mounting reflection member | After mounting reflection member |
| 2.400 | 1.4740 | 2.0416 |
| 2.485 | 3.2806 | 1.7650 |
| 5.150 | 2.8769 | 3.2204 |
| 5.875 | 1.4915 | 1.7504 |

As illustrated by the graphs in FIGS. 6 and 7, it can be seen that the voltage standing wave ratios of the radiation conductor 133 at the relevant resonance frequencies before and after mounting the reflection member 135 are stable.

The results of measuring the directionality, transmission/reception stability, and the like of the antenna device 103 as well as the resonance frequency characteristic will be described with reference to FIGS. 8 to 10.

Figure 8:
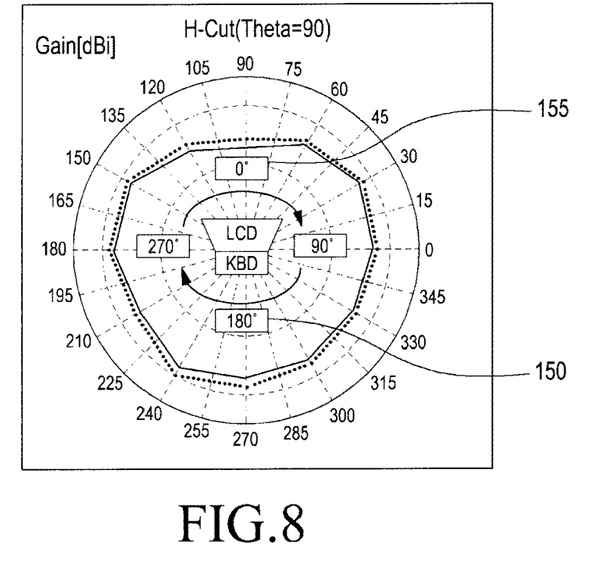
FIG. 8, FIG. 9 and FIG. 10 are graphs showing directionality of an antenna device in an electronic device according to one embodiment of the present disclosure.
Figure 9:
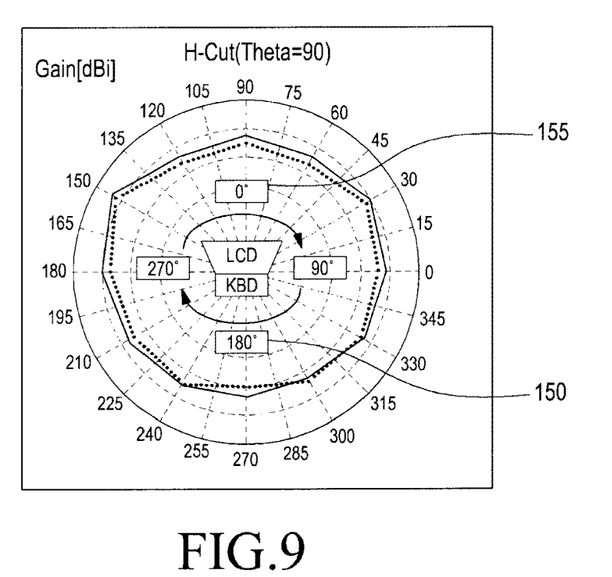
Figure 10:
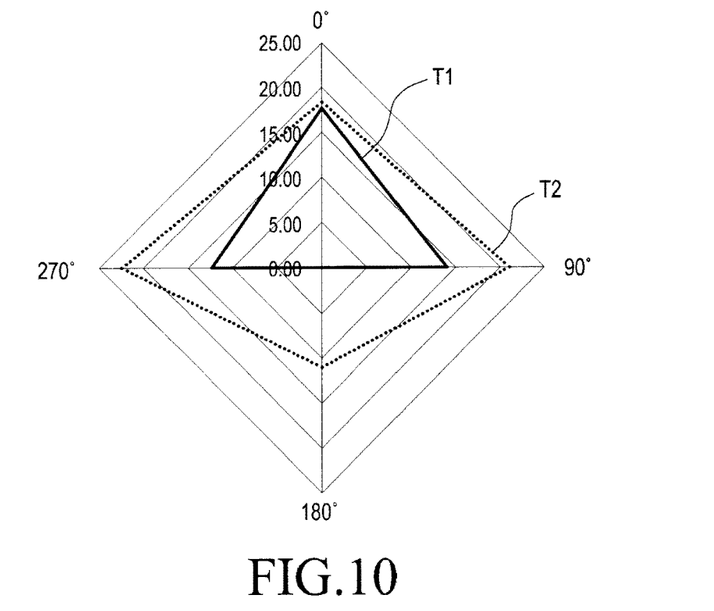

FIGS. 8 to 10 are graphs showing the directionality of the antenna device 103 in an electronic device according to one embodiment of the present disclosure (e.g., the electronic device 100 of FIG. 5).

First, the graphs of FIGS. 8 and 9 illustrate radiation patterns on the H-plane before (FIG. 8) and after (FIG. 9) mounting the above-mentioned reflection member (the reflection member 135 of FIG. 5). In these figures, the 180 degree angle direction 150 is the direction where the user is normally located when using the electronic device 100. Referring to FIGS. 8 and 9, it can be seen that the directionality of the beam pattern increases in the 0-degree angular direction 155 when the reflection member 135 is present.

FIG. 10 is a graph illustrating throughputs measured at a distance of 100 m from an electronic device (e.g., the electronic device 100 of FIG. 5). It shall be noted that the graph is illustrated by measuring the throughput values in a 0-degree angular direction, a 90-degree angular direction, a 180-degree angular direction, and a 270-degree angular direction and then simply interconnecting the measured throughput values with straight lines. For example, the actual throughput measurement in a 45-degree angular direction may be different from that on the graph of FIG. 10. The term "throughput" means the amount of valid data transceived (transmitted/received) or processed during a specified time, and may be in units of "Mbps." In FIG. 10, the graph indicated by "T1" represents the throughput measured using an electronic device without the reflection member 135, and the graph indicated by "T2" represents the throughput measured using an electronic device with the reflection member 135. As illustrated in FIG. 10, according to one embodiment of the present disclosure, all else being the same, the directionality of the antenna device is improved when the reflection member 135 is adjacent to the radiation conductor 133, such that faster and more stable transmission/reception of radio waves can be achieved.

In general, the radiation performance of the antenna device radiation conductor itself may be satisfactory. However, when the antenna device is disposed in the electronic device, electromagnetic interference may be caused by peripheral metal structures or metallic portion of the electronic device 100 (e.g., the above-described hinge protrusion (the hinge protrusion 123 in FIG. 1) or hinge device). For example, when the antenna device is disposed in the electronic device, the performance of the antenna device may deteriorate. In view of the above-described measurement results, when the antenna device (e.g., the antenna device 103 of FIG. 5) includes the reflection member 135 disposed adjacent to the radiation conductor 133, it is possible to change the traveling path of the radio waves transmitted/received by the radiation conductor 133 to avoid the metallic portions of the electronic device, or to compensate for the distortion or deterioration of the radiation performance in a certain direction.

Figure 11:
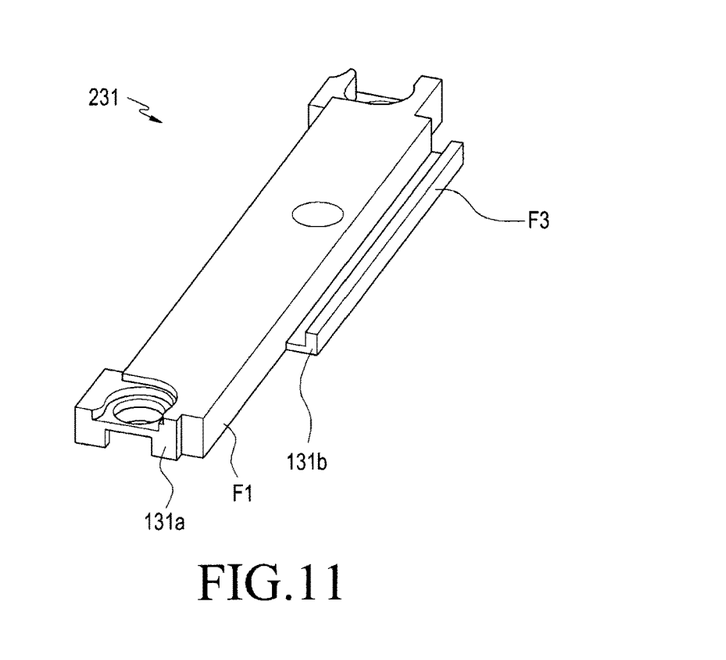
FIG. 11, FIG. 12 and FIG. 13 are perspective views each illustrating a modified embodiment of an antenna device according to other embodiments of the present disclosure.
Figure 12:
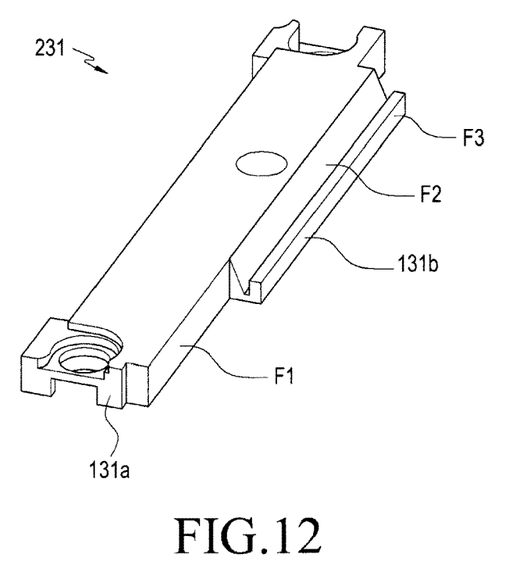
Figure 13:
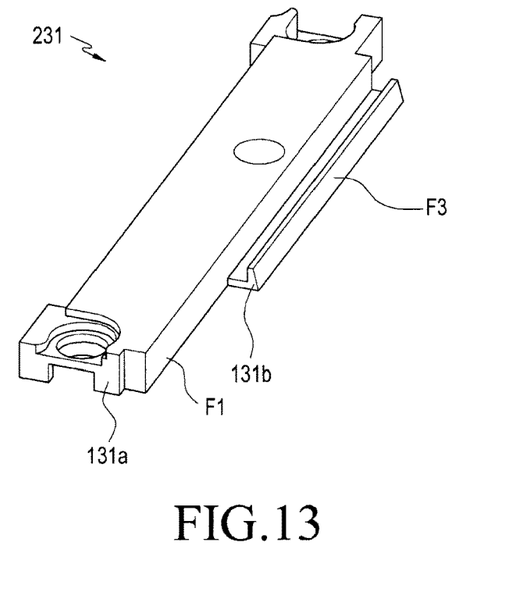

FIGS. 11 to 13 are perspective views each illustrating a modified embodiment of an antenna device according to other embodiments of the present disclosure.

Referring to FIGS. 11 to 13, the faces of the antenna carrier 231, on which the above-mentioned radiation conductor (e.g., the radiation conductor 133 in FIG. 4 or 5) and the reflection member (e.g., the reflection member 135 in FIG. 4 or 5) are disposed respectively, may be formed parallel to each other. In another embodiment, the faces of the antenna carrier 231 may include portions that are inclined with respect to each other. Referring to FIG. 11, the faces F1 and F3, on which the radiation conductor and the reflection member are disposed, respectively, may be parallel to each other. Referring to FIG. 12, the face F1, on which the radiation conductor is disposed, may include a partially inclined face F2. Referring to FIG. 13, a face F3, on which the reflection member is disposed, may be formed to be inclined with respect to the face F1, on which the radiation conductor is disposed. In consideration of the radiation performance and radiation characteristics required of the above-described electronic device (e.g., the electronic device 100 in FIG. 1) and/or the antenna device (the antenna device 103 in FIG. 4), the shape of the antenna carrier 231 (e.g., the shapes of the faces F1 and F2 on which the radiation conductor and the reflection member are disposed, respectively) may be designed to have various geometries.

Figure 14:
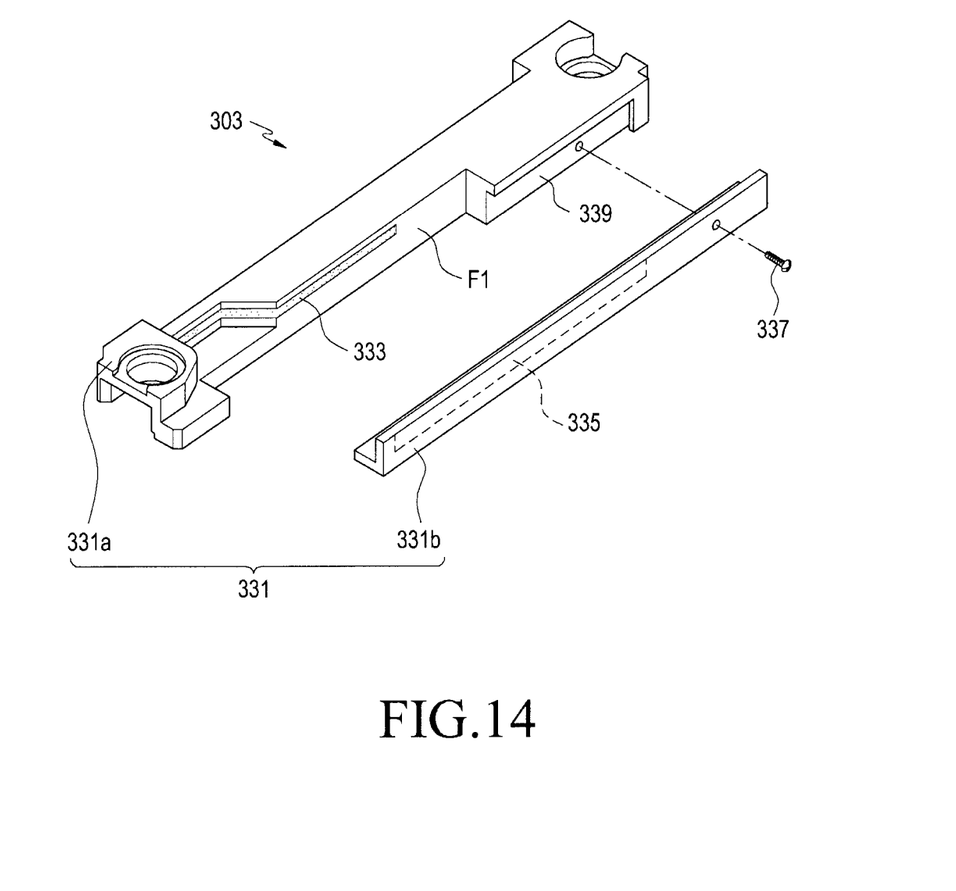
FIG. 14 is an exploded perspective view illustrating another modified embodiment of an antenna device according to another embodiment of the present disclosure.
Figure 15:
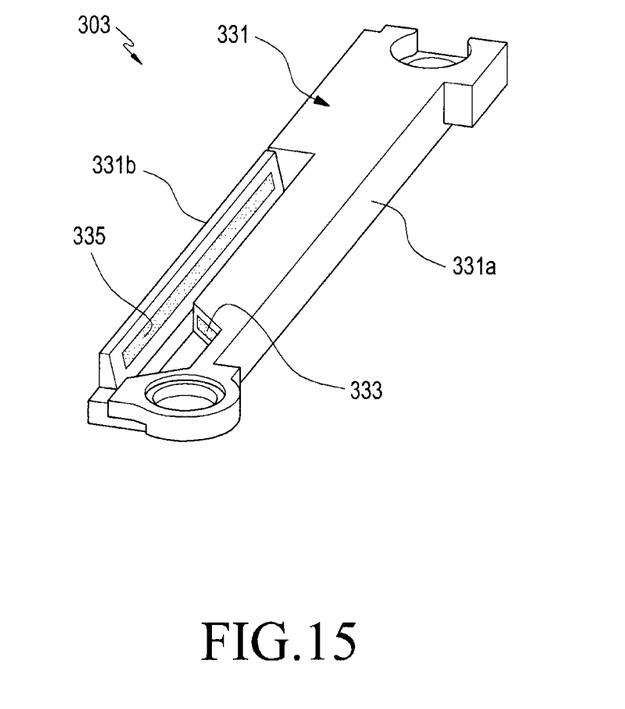
FIG. 15 is a perspective view illustrating still another modified embodiment of an antenna device according to another embodiment of the present disclosure.

FIG. 14 is an exploded perspective view illustrating another modified embodiment of an antenna device according to another embodiment of the present disclosure. FIG. 15 is a perspective view illustrating still another modified embodiment of an antenna device according to another embodiment of the present disclosure.

Referring to FIGS. 14 and 15, in an antenna device 303 according to another embodiment of the present disclosure, a body portion 331*a* and an extension portion 331*b* of an antenna carrier 331 are manufactured as separate components and are then coupled to each other through an assembly process.

The body portion 331*a* may have a groove(s) 339 formed to correspond to the extension portion 331*b* on side face F1. The radiation conductor 333 is disposed on F1. For example, the extension portion 331*b* may be engaged with the body portion 331*a* using a shape-coupling structure (or a snap-fit structure). In some embodiments, the extension portion 331*b* may be fastened and fixed to the body portion 313*a* by a fastening member (e.g., a screw 337). In another embodiment, the extension portion 331*b* may be attached to a groove 339 by an adhesive or adhesive tape. In another embodiment, the extension portion 331*b* may be coupled to the body portion 331*a* through processes such as ultrasonic welding. According to one embodiment, a reflection member 335 of the antenna device 303 may be attached to one face of the extension portion 331*b*, in which, when the extension portion 331*b* is coupled to the body portion 331*a*, the reflection member 335 may be disposed to at least partially face the radiation conductor 333.

Figure 16:
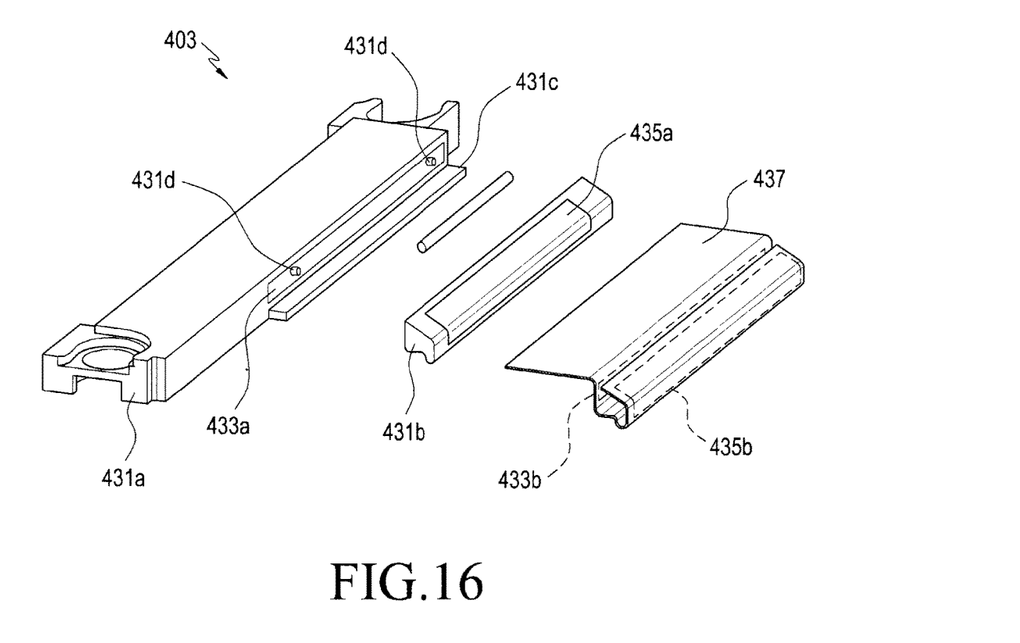
FIG. 16 is an exploded perspective view illustrating still another modified embodiment of an antenna device according to another embodiment of the present disclosure.
Figure 17:
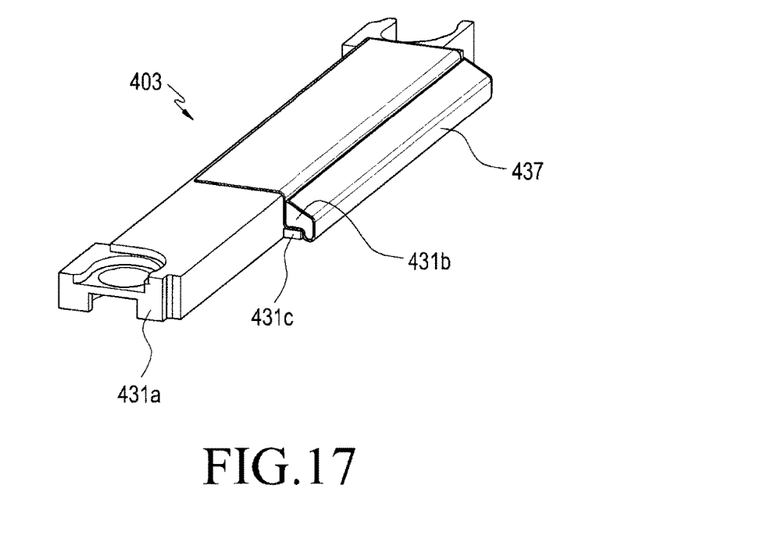
FIG. 17 is a perspective view illustrating still another modified embodiment of an antenna device according to another embodiment of the present disclosure.

FIG. 16 is an exploded perspective view illustrating still another modified embodiment of an antenna device according to another embodiment of the present disclosure. FIG. 17 is a perspective view illustrating still another modified embodiment of an antenna device according to another embodiment of the present disclosure.

Referring to FIGS. 16 and 17, according to other embodiments of the present disclosure, an antenna device 403 may include a body portion 431*a*, an extension portion 431*b*, a radiation conductor 433*a*, a reflection member 435*a*, and a flexible printed circuit board 437.

The body portion 431*a* and the extension portion 431*b* may be fabricated as separate components and may then be coupled to each other so as to form an antenna carrier (e.g., the antenna carrier 131 in FIG. 4). The antenna device 403 may include a support rib 431*c* and a welding protrusion 431*d* to facilitate coupling of the body portion 431*a* and the extension portion 431*b* to each other. For example, the extension portion 431*b* may be coupled to the body portion 431*a* such that one face of the extension portion 431*b* faces one face of the body portion 431*a* (e.g., the face on which the welding protrusion 431*d* is formed) while one side face of the extension portion 431*b* is supported by the support rib 431*c*. When the welding protrusion 431*d* is irradiated with ultrasonic waves when the extension portion 431*b* and the body portion 431*a* are in contact with each other, the welding protrusion 431*d* is temporarily melted, so that the extension portion 431*b* can be attached and fixed to the body portion 431*a*.

In one embodiment, the radiation conductor 433*a* and the reflection member 435*a* of the antenna device 403 may be disposed on the body portion 431*a* and the extension portion 431*b*, respectively. For example, the radiation conductor 433*a* is disposed on one face of the body portion 431*a* (e.g., the face on which the welding protrusion 431*d* is formed), and the reflection member 435*a* may be disposed on the extension portion 431*b*. According to this embodiment, at least a portion of the extension portion 431*b* may be positioned between the radiation conductor 433*a* and the reflection member 435*a*. In some embodiments, when the extension portion 431*b* is coupled to the body portion 431*a*, the radiation conductor 433*a* may be concealed by the extension portion 431*b*.

According to one embodiment, the flexible printed circuit board 437 may provide a feed signal to the radiation conductor 433*a*. For example, a data signal provided to the radiation conductor 433*a* may be transmitted from a communication module of the above-described electronic device (e.g., the electronic device 100 in FIG. 1) through the flexible printed circuit board 437. The flexible printed circuit board 437 may extend to partially enclose, for example, the body portion 431*a* and the extension portion 431*b*, and may be partly disposed between the body portion 431*a* and the extension portion 431*b*. In some embodiments, the welding protrusion 431*d* is fused to a portion of the flexible printed circuit board 437 when a portion of the flexible printed circuit board 437 is located between the body portion 431*a* and the extending portion 431*b*. For example, a portion of the flexible printed circuit board 437 can be fixed when the extension portion 431*b* is coupled to the body portion 431*a*.

According to one embodiment, the flexible printed circuit board 437 may include a conductive pattern 433*b* or 435*b* that replaces the radiation conductor 433*a* and/or the reflection member 435*a*, or is combined with the radiation conductor 433*a* and/or the reflection member 435*a*. For example, a printed circuit pattern formed on the flexible printed circuit board 437 may include a conductor pattern(s) 433*b* or 435*b* formed in the region corresponding to the radiation conductor 433*a* and/or the reflection member 435*a*, and the conductor pattern(s) 433*b* or 435*b* may replace the radiation conductor 433*a* and/or the reflection member 435*a*, or may be combined with the radiation conductor 433*a* and/or the reflection member 435*a*, thereby serving as the radiation conductor and/or the reflection member of the antenna device 403.

An antenna device according to one embodiment of the present disclosure is an antenna device for an electronic device including a first housing and a second housing rotatably coupled to the first housing about a hinge axis. The antenna device may include a radiation conductor disposed in the first housing and a reflection member disposed adjacent to the radiation conductor in the first housing. Radio waves transceived by the radiation conductor may be radiated via the reflection member.

According to one embodiment, the first housing may include a hinge recess formed on one side edge thereof, the second housing may include a hinge protrusion formed on one side edge thereof, the hinge protrusion adapted to rotatably couple to the hinge recess, and the antenna device is disposed in the first housing adjacent to the hinge recess.

According to one embodiment, the reflection member may be disposed between the radiation conductor and the hinge recess.

According to one embodiment, the reflection member may be disposed within a distance of λ/10 from the radiation conductor. Here, "λ" may mean a resonance frequency wavelength of the antenna device.

According to one embodiment, the antenna device may further include an antenna carrier mounted on an inner face of the first housing, and at least one of the radiation member and the reflection member may be mounted on the antenna carrier.

According to one embodiment, the antenna device may include a plurality of antenna carriers, and the plurality of antenna carriers are mounted along the hinge axis.

According to one embodiment, a portion of the antenna carrier may be exposed to an outside of the first housing.

According to one embodiment, the portion of the antenna device exposed to the outside of the first housing may be concealed by a portion of the second housing.

According to one embodiment, the antenna carrier may include a body portion mounted on an inner face of the first housing, and an extension portion protruding from a side face of the body portion, and the radiation conductor and the reflection portion may be mounted on the side face and the extension portion, respectively.

According to one embodiment, the body portion and the extension portion may be integrally molded.

According to one embodiment, the antenna device may further include a fastening member that fastens the extension portion to the body portion.

According to one embodiment, the antenna device may further include a welding protrusion formed on the side face and adapted to facilitate welding of the extension portion to the body portion by fusion.

According to one embodiment, the extension portion may include an inclined face inclined with respect to the side face, and the reflection member is mounted on the inclined face.

According to one embodiment of the present disclosure, an electronic device may include a first housing including a hinge recess formed on one side edge thereof, a second housing including a hinge protrusion formed on one side edge thereof, the hinge protrusion adapted to rotatably couple to the hinge recess, and an antenna device disposed in the first housing adjacent to the hinge recess.

The antenna device may include a radiation conductor and a reflection member disposed adjacent to the radiation conductor. The reflection member is configured to change a radiation direction of radio waves transceived by the radiation conductor.

According to one embodiment, the second housing may be rotated about a hinge axis extending in one direction such that the second housing may be rotated from a position at which the second housing faces the first housing to a position where the second housing is opened by a predetermined angle with respect to the first housing, and the hinge recess may have a groove shape that extends in the one direction.

According to one embodiment, the reflection member may be disposed between the radiation conductor and the hinge recess.

According to one embodiment, the electronic device and/or the antenna device may further include an antenna carrier, and at least one of the radiation member and the reflection member may be disposed on the antenna carrier.

According to one embodiment, a face of the hinge recess may include an opening through which at least a portion of the antenna device may be exposed to an outside of the first housing.

According to various embodiments, the portion of the antenna carrier exposed to the hinge recess may be concealed by the hinge protrusion.

According to various embodiments, the hinge protrusion may include a portion that is made of a metal material.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. An antenna device for an electronic device including a first housing and a second housing rotatably coupled to the first housing about a hinge axis, the antenna device comprising:
    an antenna carrier mounted on an inner face of the first housing;
    a radiation conductor disposed in the first housing; and
    a reflection member disposed adjacent to the radiation conductor in the first housing,
    wherein,
        radio waves transceived by the radiation conductor are radiated via the reflection member,
        the antenna carrier includes a body portion mounted on the inner face of the first housing and an extension portion protruding from a side face of the body portion, and
        the radiation conductor and the refection member are mounted on the side face and the extension portion, respectively.

2. The antenna device of claim 1, wherein the first housing includes a hinge recess formed on one side edge thereof,
    the second housing includes a hinge protrusion formed on one side edge thereof, the hinge protrusion adapted to rotatably couple to the hinge recess, and
    the antenna device is disposed in the first housing adjacent to the hinge recess.

3. The antenna device of claim 2, wherein the reflection member is disposed between the radiation conductor and the hinge recess.

4. The antenna device of claim 1, wherein the reflection member is disposed within a distance of λ/10 from the radiation conductor, wherein λ is a resonance frequency wavelength of the antenna device.

5. The antenna device of claim 1, wherein the antenna device includes a plurality of antenna carriers, and the plurality of antenna carriers are mounted along the hinge axis.

6. The antenna device of claim 1, wherein a portion of the antenna device is exposed to an outside of the first housing.

7. The antenna device of claim 6, wherein the portion of the antenna device exposed to the outside of the first housing is concealed by a portion of the second housing.

8. The antenna device of claim 1 wherein the body portion and the extension portion are integrally molded.

9. The antenna device of claim 1, further comprising:
    a fastening member that fastens the extension portion to the body portion.

10. The antenna device of claim 1, further comprising:
    a welding protrusion formed on the side face and adapted to facilitate welding of the extension portion to the body portion by fusion.

11. The antenna device of claim 1, wherein the extension portion includes an inclined face inclined with respect to the side face, and the reflection member is mounted on the inclined face.

12. An electronic device comprising:
- a first housing including a hinge recess formed on one side edge thereof;
- a second housing including a hinge protrusion formed on one side edge thereof, the hinge protrusion adapted to rotatably couple to the hinge recess; and
- an antenna device disposed in the first housing adjacent to the hinge recess,
- wherein the antenna device includes:
  - a radiation conductor; and
  - a reflection member disposed adjacent to the radiation conductor, wherein the reflection member is configured to change a radiation direction of radio waves transceived by the radiation conductor, and
- wherein the reflection member is disposed between the radiation conductor and the hinge recess.

13. The electronic device of claim 12, wherein the second housing is rotated about a hinge axis extending in one direction such that the second housing is rotated from a position at which the second housing faces the first housing to a position where the second housing is opened by a predetermined angle with respect to the first housing, and
- the hinge recess has a groove shape that extends in the one direction.

14. The electronic device of claim 12, wherein the antenna device further comprises an antenna carrier, and
- wherein at least one of the radiation conductor and the reflection member is mounted on the antenna carrier.

15. The electronic device of claim 12, wherein a face of the hinge recess includes an opening through which at least a portion of the antenna device is exposed to an outside of the first housing.

16. The electronic device of claim 15, wherein the portion of the antenna device exposed to the outside of the first housing is concealed by the hinge protrusion.

17. The electronic device of claim 16, wherein the hinge protrusion includes a portion that is made of a metal material.

* * * * *